US010776855B2

(12) United States Patent
Dhurandhar et al.

(10) Patent No.: US 10,776,855 B2
(45) Date of Patent: Sep. 15, 2020

(54) INTERPRETABLE RULE GENERATION USING LOSS-PRESERVING TRANSFORMATION

(71) Applicant: International Business Machines Corporation, Armonk, NY (US)

(72) Inventors: Amit Dhurandhar, Yorktown Heights, NY (US); Sechan Oh, New York, NY (US); Marek Petrik, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 15/842,538

(22) Filed: Dec. 14, 2017

(65) Prior Publication Data
US 2018/0300792 A1    Oct. 18, 2018

Related U.S. Application Data

(63) Continuation of application No. 15/489,418, filed on Apr. 17, 2017.

(51) Int. Cl.
*G06Q 30/00* (2012.01)
*G06Q 30/06* (2012.01)

(52) U.S. Cl.
CPC .............. *G06Q 30/0631* (2013.01)

(58) Field of Classification Search
CPC ............. G06Q 30/00; G06Q 30/0601; G06Q 30/0613; G06Q 30/0623; G06Q 30/0629; G06Q 30/0631
See application file for complete search history.

(56) References Cited

U.S. PATENT DOCUMENTS

| 8,386,336 B1* | 2/2013 | Fox ................... G06Q 30/0253 705/26.1 |
| 2001/0021914 A1* | 9/2001 | Jacobi ................ G06Q 30/02 705/14.53 |

(Continued)

OTHER PUBLICATIONS

Jain, Himanshu, Yashoteja Prabhu, and Manik Varma. "Extreme multi-label loss functions for recommendation, tagging, ranking & other missing label applications." Proceedings of the 22nd ACM SIGKDD International Conference on Knowledge Discovery and Data Mining. 2016. (Year: 2016).*

(Continued)

*Primary Examiner* — Christopher B Seibert
(74) *Attorney, Agent, or Firm* — Amin, Turocy & Watson, LLP

(57) ABSTRACT

Techniques facilitating interpretable rule generation using loss-preserving transformation are provided. In one example, a computer-implemented method can comprise evaluating, by a system operatively coupled to a processor, an input data set that comprises three data categories. The computer-implemented method can also comprise transforming, by the system, the input data set into a transformed data set. The transformed data set can comprise two data categories determined based on the three data categories. Transforming the input data set can comprise determining a first cost associated with the transformed data set is no greater than a second cost associated with the input data set.

20 Claims, 10 Drawing Sheets

(56) References Cited

U.S. PATENT DOCUMENTS

| | | | | |
|---|---|---|---|---|
| 2008/0201272 | A1* | 8/2008 | Davis | G06Q 10/04 |
| | | | | 705/400 |
| 2009/0110089 | A1* | 4/2009 | Green | H04L 5/0037 |
| | | | | 375/260 |
| 2010/0268661 | A1* | 10/2010 | Levy | G06Q 30/02 |
| | | | | 705/347 |
| 2012/0047105 | A1* | 2/2012 | Saigal | G06F 19/00 |
| | | | | 706/52 |
| 2013/0132315 | A1* | 5/2013 | Principe | G06K 9/6215 |
| | | | | 706/20 |
| 2014/0006166 | A1 | 1/2014 | Chiang et al. | |
| 2014/0180760 | A1* | 6/2014 | Karatzoglou | G06Q 30/0201 |
| | | | | 705/7.29 |
| 2015/0142580 | A1 | 5/2015 | Aydin et al. | |
| 2017/0132509 | A1* | 5/2017 | Li | G06Q 30/0631 |

OTHER PUBLICATIONS

U.S. Appl. No. 15/489,418, filed Apr. 17, 2017.
Non-Final Office Action for U.S. Appl. No. 15/489,418 dated Apr. 5, 2019, 24 pages.
Petrik et al., "Interpretable Policies for Dynamic Product Recommendations," Proceedings of the Thirty-Second Conference on Uncertainty in Artificial Intelligence, 2016, pp. 607-616, ACM, 10 pages.
Lakkaraju et al., "Interpretable Decision Sets: A Joint Framework for Description and Prediction," Proceedings of the 22nd ACM SIGKDD International Conference on Knowledge Discovery and Data Mining, Aug. 2016, pp. 1675-1684, ACM, 10 pages.
Dhurandhar et al., "Building an Interpretable Recommender via Loss-Preserving Transformation," ICML Workshop on Human Interpretability in Machine Learning, 2016, pp. 11-15, 5 pages.
Su et al., "Interpretable Two-Level Boolean Rule Learning for Classification," ICML Workshop on Human Interpretability in Machine Learning, 2016, pp. 66-70, 5 pages.
Wang et al., "Bayesian Or's of And's for Interpretable Classification with Application to Context Aware Recommender Systems," 2015, 13 pages.
Breiman et al., "Classification and Regression Trees," Wadsworth Statistics/Probability Series, 1984, 1 page.
Salzberg, "Book Review: C4.5: Programs for Machine Learning," 1994, Machine Learning, pp. 235-240, vol. 16, Kluwer Academic Publishers, 6 pages.
Zhou et al., "On Multi-Class Cost-Sensitive Learning," AAAI'06 Proceedings of the 21st National Conference on Artificial Intelligence, 2006, pp. 567-572, vol. 1, 6 pages.
Hastie et al., "The Elements of Statistical Learning: Data Mining, Inference and Prediction," Second Edition, 2009, Springer, 764 pages.
Li et al., "Unbiased Offline Evaluation of Contextual-bandit-based News Article Recommendation Algorithms," Proceedings of the Fourth International Conference on Web Search and Web Data Mining, 2011, pp. 297-306, 10 pages.
Kim et al., "Mind the Gap: A Generative Approach to Interpretable Feature Selection and Extraction," Advances in Neural Information Processing Systems, 2015, pp, 2251-2259, 10 pages.
Ide et al., "Informative Prediction based on Ordinal Questionnaire Data," IEEE International Conference on Data Mining, 2015, pp. 191-200, 10 pages.
Drummond et al., "Exploiting the Cost (In)sensitivity of Decision Tree Splitting Criteria," Proceedings of the Seventeenth International Conference on Machine Learning, 2000, pp. 239-246, 8 pages.
Dash et al., "Screening for Learning Classification Rules Via Boolean Compressed Sensing," IEEE International Conference on Acoustic, Speech and Signal Processing (ICASSP), 2014, pp. 3360-3364, 5 pages.
Ling et al., "Decision Trees with Minimal Costs," Proceedings of the 21st International Conference on Machine Learning (ICML), 2004, 8 pages.
Ling et al., "Cost-Sensitive Learning and the Class Imbalance Problem," Encyclopedia of Machine Learning, 2008, Springer, 8 pages.
Zadrozny et al., "Cost-Sensitive Learning by Cost-Proportionate Example Weighting," Proceedings of the Third IEEE International Conference on Data Mining (ICDM'03), 2003, IEEE, 8 pages.
Abe et al., "An Iterative Method for Multi-class Cost-sensitive Learning," ACM Conference on Knowledge Discovery and Data Mining (KDD), 2004, pp. 3-11, ACM, 9 pages.
Lomax et al., "A Survey of Cost-Sensitive Decision Tree Induction Algorithms," ACM Computing Surveys, Feb. 2013, vol. 45, No. 2, Article 16, 35 pages.
Domingos, "Metacost: A General Method for Making Classifiers Cost-Sensitive," Proceedings of the ACM SIGKDD Conference on Knowledge Discovery and Data Mining, 1999, pp. 155-164. ACM, 10 pages.
Malioutov et al., "Exact Rule Learning via Boolean Compressed Sensing," Proceedings of the International Conference on Machine Learning, 2013, pp. 765-773, 9 pages.
Final Office Action received for U.S. Appl. No. 15/489,418 dated Dec. 6, 2018, 15 pages.
Non-Final Office Action received for U.S. Appl. No. 15/489,418 dated Apr. 3, 2020, 13 pages.

* cited by examiner

INTERPRETABLE RULE GENERATION USING LOSS-PRESERVING TRANSFORMATION

BACKGROUND

The subject disclosure relates to rule generation, and more specifically, interpretable rule generation using loss-preserving transformation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate interpretable rule generation are described.

According to an embodiment, a computer-implemented method can comprise evaluating, by a system operatively coupled to a processor, an input data set that comprises three data categories. The computer-implemented method can also comprise transforming, by the system, the input data set into a transformed data set. The transformed data set can comprise two data categories determined based on the three data categories. Transforming the input data set can comprise determining a first cost associated with the transformed data set is no greater than a second cost associated with the input data set.

According to an embodiment, a system can comprise a memory that stores computer executable components and a processor that executes computer executable components stored in the memory. The computer executable components can comprise an evaluation component that evaluates an input data set that comprises three related data inputs. The computer executable components can also comprise a conversion component that transforms the three related data inputs into a transformed data set based on a reduction of a loss function associated with the three related data inputs. The transformed data set can comprise output data pairs. The loss function can be based on a first expenditure associated with the transformed data set being no greater than a second expenditure associated with the input data set.

According to another embodiment, a computer program product for facilitating interpretable rule generation using loss-preserving transformation can comprise a computer readable storage medium having program instructions embodied therewith. The program instructions are executable by a processing component. The program instructions can cause the processing component to generate, by the processing component, a model that predicts a first positive outcome based on a first feature and a first action. The first feature can be selected from one or more historical features and the first action can be selected from one or more historical actions. An input data set can comprise the one or more historical features, the one or more historical actions, and one or more historical outcomes. The program instructions can also cause the processing component to determine, by the processing component, a second positive outcome based on a combination of the one or more historical actions, excluding the first action, and the one or more historical features, excluding the first feature. Further, the instructions can cause the processing component to transform, by the processing component, the input data set into a transformed data set. Elements of the transformed data set can comprise a pair of data categories. Further, the pair of data categories can comprise an output feature and an output action.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects discussed herein relate to predictive analytics. Specifically, the various aspects can transform or map multiple input data into output data determined to have a higher conversion (or success) rate than a success rate associated with the multiple input data. For example purposes and not limitation, various aspects can relate to a recommendation system for customized content that can be recommended to an entity. When an entity is browsing online content, such as on a retail website, the recommendation system can recommend or suggest content to the entity. Based on the recommendation, the entity might accept or ignore the recommendation (e.g., a form of feedback). The recommendation and associated feedback (e.g., the input data) can be transformed into another recommendation (e.g., a new recommendation) determined to have a higher probability of successful feedback (e.g., a higher likelihood that the entity will accept the new recommendation).

According to some implementations, the multiple input data can be represented as sets of three (e.g., data triples) and the output data can be represented as pairs of data. However, another quantity of input data and/or output data can be utilized with the disclosed aspects. The transformation can be performed such that a minimization of loss in the original space can be equal (or nearly equal) to minimization of a 0-1 loss in the new space. A 0-1 loss (or 0-1 loss function) is a type of loss function that maps an event or a value of one or more variables into a real number that represents a cost associated with the event or the value. Thus, the cost of the output data can be about the same as the cost of the multiple input data.

Upon or after the transformation, a learning method can be applied to the transformed data set, which can minimize and/or reduce an error in the original space. Accordingly, decision trees, Support Vector Machines (SVMs), neural networks and/or other machine learning can be performed with respect to the multiple input data.

Figure 1:
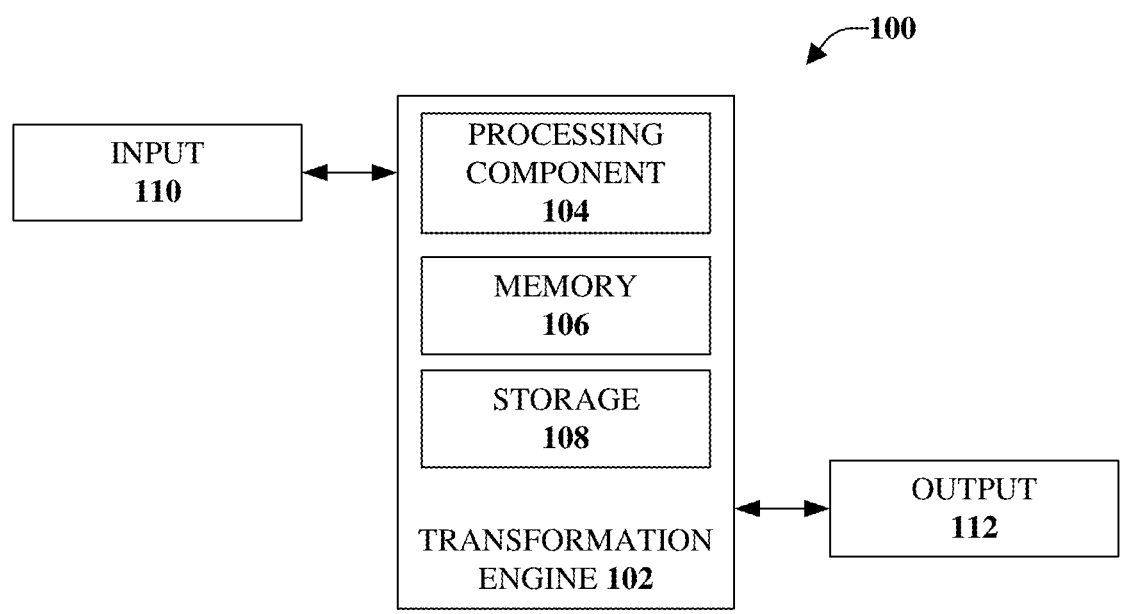
FIG. 1 illustrates a block diagram of an example, non-limiting system that facilitates interpretable rule generation using loss-preserving transformation in accordance with one or more embodiments described herein.

FIG. 1 illustrates a block diagram of an example, non-limiting system 100 that facilitates interpretable rule generation using loss-preserving transformation in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can comprise a transformation engine 102, a processing component 104, a memory 106, and/or a storage 108. In some embodiments, one or more of the transformation engine 102, the processing component 104, the memory 106, and/or the storage 108 can be communicatively and/or operatively coupled to one another to perform one or more functions of the non-limiting system 100.

Predictive analysis can be used to support decision making in various application technologies including, but not limited to, online marketing, health care, and personalized recommendation systems. In these application technologies, the ability to interpret (e.g., the interpretability of) the recommendation logic might be important for the adoption of the decision support tool. For example, marketing managers (e.g., users of online marketing applications) might be uncomfortable with relying on "black-box" recommendation algorithms that are not understandable, verifiable, or customizable to fit their needs. Thus, the various aspects discussed herein can provide rules that are simple and capable of being interpreted and understood.

In various embodiments, the transformation engine 102 can receive as input 110 input data that can be represented as sets of data, which can include historical information gathered over time. According to an implementation, the input data can include sets of three types of data that are related to one another (e.g., data triples). However, according to other implementations, the input data can include any number of data. It is noted that the various aspects discussed herein include various quantities, associated titles, and/or associated definitions for the input data and/or the output data. These quantities, titles, and/or definitions are provided for example purposes only and other implementations may utilize different quantities, titles, and/or definitions for the input data and/or output data.

As an example related to online marketing, a data triple can include (1) features, (2) actions, and (3) outcomes. The "features" (or user features) can include information known about the user (e.g., age, historical online activity, previous purchases, likes, dislikes, and so on). The "actions" can include historical recommendations provided to the user. For example, as a user is browsing an online bookstore, the user can be presented with recommendations of books that might be of interest to the user. The "outcome" can be a result of the "actions" (or recommendations) provided to the user (e.g., feedback). In an example, the "outcome" (or the feedback) can be the user ignoring the recommendation, which can be a negative feedback and can indicate the user was not interested in the book recommended, already has read the book, or for some other reason did not respond positively to the recommendation (e.g., in a hurry, budget constraints, and so on). Alternatively, the "outcome" (feedback) can be the user requesting more information related to the book, purchasing the book, or another type of positive feedback (e.g., the user rated the book positively, the user provided a positive review, the user saved details of the book for a later purchase, and so on).

According to another example related to a health care application, the "features" can include historical information about the patient (e.g., medical conditions, prescription history, age, family medical history, and so on). The "actions" can include one or more treatment options, one or more prescription options, alterative treatment options, alterative prescription options, and so on. The "outcome" (e.g., feedback) can include the doctor (and/or the patient) selecting one of the recommendations, which can be a positive feedback. Alternatively, the "outcome" can be a negative feedback, such as the doctor and/or the patient requesting additional options or choosing a different treatment option (e.g., choosing a natural remedy instead of a prescription medication). In another implementation, the "outcome" can be whether the patient responded positively to the treatment.

In accordance with an embodiment, the transformation engine 102 upon or after receiving the input 110 can generate one or more models or representations that can predict a positive outcome based on the input 110. For example, the transformation engine 102 can transform the multiple input data received as input 110 and construct a model that can be utilized to determine or predict a conversion probability for output data corresponding to the multiple input data. The conversion probability is the likelihood of the user providing positive feedback (e.g., outcome) in response to the "action" or recommendation. The conversion probability can be expressed as a percentage, according to some implementations. For example, the conversion probability can be expressed as the percentage likelihood that an action or recommendation provided will receive a positive outcome or positive feedback (e.g., the user will purchase the book, the doctor will select the medication recommended). The output data can be provided as output 112 from the transformation engine 102.

According to some implementations, the output data can include output pairs that can include one or more "features" and one or more related "actions." Since an "outcome" is based on a response to the "action," the output data does not include an "outcome." Thus, sets of related data can be transformed into data that is more tailored or customized for an entity and/or user based on available historical information.

Further, the transformation engine 102 can determine a loss-preserving sample weight of the output data as compared to the input data. For example, the loss-preserving sample weight can determine if a cost associated with the output data is about the same as a cost associated with the input data. The loss-preserving sample weight can be determined based on the 0-1 loss function (e.g., a cost associated with the output data is the same as, or less than, a cost associated with the input data). A classification data set can be generated by the transformation engine 102 based on the loss-preserving sample weight. Additionally, rule learning algorithms can be applied to generate recommendation rules that are easily capable of being interpreted by one or more entities according to the various aspects provided herein.

The systems and/or the components of the systems discussed herein can be employed to use hardware and/or software to solve problems that are highly technical in nature (e.g., perform transform operations on a large amount of data), that are not abstract and that cannot be performed as a set of mental acts by a human. For example, the transformation provided herein utilizes conversion probabilities for all actions for the one or more user features, which can be estimated from data. A prediction error of the conversion probability estimation can influence construction of the transformed data, which can affect a trained classifier. Analysis of the impact of the prediction error in an original space on a quality of the classifier on the transformed space can help improve the transformation to reduce a loss associated with recommendation rules. In another example, there is no constraint on the size of the data that can be utilized with the disclosed aspects. Further, even though the input data is scalable, there is no corresponding decrease in processing efficiency, as will be discussed in further detail below. In some implementations, there can be terabits of data and billions of input data, which cannot be transformed as a set of mental acts. For example, a human, or even thousands of humans, cannot efficiently, accurately and effectively manually analyze the voluminous amounts of inputs and data that can be utilized to generate an output, which can be time consuming and might never be successfully performed. Thus, the one or more embodiments of the subject computer processing systems, methods, apparatuses, and/or computer program products can enable the automated determination of a suitable output data based on the input data.

Figure 2:
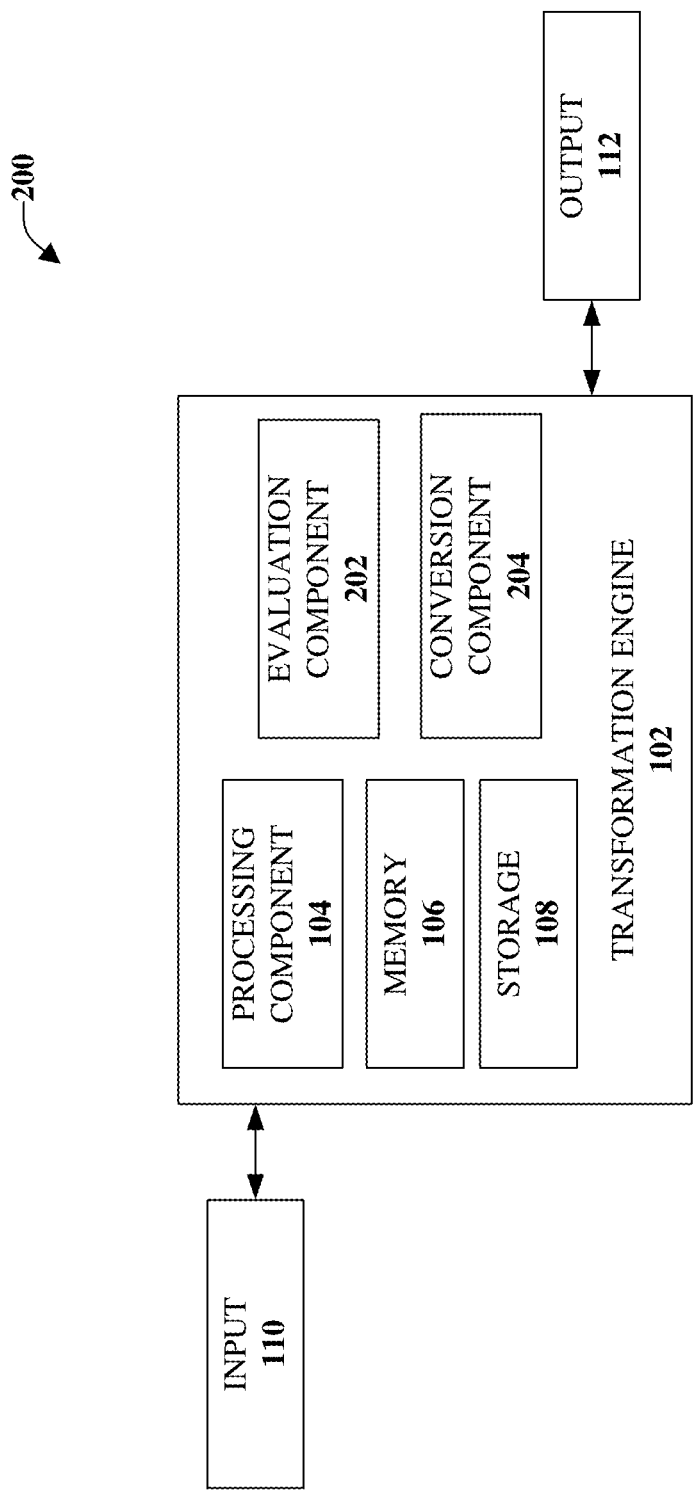
FIG. 2 illustrates a block diagram of an example, non-limiting system that facilitates an interpretable recommendation for customized outputs in accordance with one or more embodiments described herein.

FIG. 2 illustrates a block diagram of an example, non-limiting system 200 that facilitates an interpretable recommendation for customized outputs in accordance with one or more embodiments described herein. Repetitive description of like elements employed in other embodiments described herein is omitted for sake of brevity.

The non-limiting system 200 can comprise one or more of the components and/or functionality of non-limiting system 100, and vice versa. As illustrated, the transformation engine 102 can include an evaluation component 202 and a conversion component 204. The evaluation component 202 can receive the input 110 and access the data contained within the input. The input 110 can include an input data set that comprises a plurality of data categories. According to an implementation, the plurality of data categories can comprise three data categories. For example, the plurality of data categories can comprises a first data category, a second data category, and a third data category. According to an implementation, the first data category can comprise feature data associated with a target entity, the second data category can comprises action data, and the third data category can comprise outcome data (e.g., feedback based on the action data). In an implementation, the target entity can be a consumer entity. In another implementation, the target entity can be a patient entity. As utilized herein an entity can be one or more computers, the Internet, one or more systems, one or more commercial enterprises, one or more computers, one or more computer programs, one or more machines, machinery, one or more actors, one or more users, one or ore more customers, one or more humans, and so forth, hereinafter referred to as an entity or entities depending on the context.

The conversion component 204 can transform the input data set (e.g., the input data) into a transformed data set or new set (e.g., the output data). To transform the input data, the conversion component 204 can build a new set (e.g., the output data) based on a conversion probability. The conversion probability can be a potential success rate of the new set (or new output data) having a positive response or positive feedback. For example, the new output data can include an outcome that can satisfy a defined condition related to a conversion probability. The defined condition can be a threshold level related to a percentage that indicates a likelihood that the target entity accepts the outcome recommendation. If below the threshold level, another condition is selected; if at or above the threshold level, the outcome is provided as the recommendation.

According to an implementation, the conversion component 204 can transform the input data set while minimizing and/or reducing a loss function associated with output data (e.g., the pairs of data categories). The loss function can be selected to be about the same as another loss function associated with the input data set. For example, a cost associated with the output data can be determined to be no greater than a cost associated with the input data. Further details related to the conversion probability and loss function are provided below with respect to FIGS. 3, 4, and 5.

In an example, the plurality of data categories assessed by the evaluation component 202 can comprise three data categories and the transformed data set can comprise pairs of two data categories determined based on the three data categories. According to some implementations, the transformed data set can comprise pairs of data categories that comprise "features" and related "actions," which can be determined to increase a probability of at least one "outcome" of the "action" (e.g., a recommendation) having a successful result (e.g., positive feedback). For example, a successful result is a customer purchasing the recommended book and/or a patient regaining his health in response to the recommended medical treatment. Additional details related to the selection of the output data are provided below with respect to FIGS. 3, 4, and 5.

In the example implementation where the target entity is a consumer entity, the "action" can be a recommended product and/or service and the "outcome" can be a purchase of the recommended product or service. For example, the product can be a book, a movie, a cellular telephone, a hair product, or any other item that can be purchased and that can be recommended based on a current internet browsing activity, historical internet browsing activities, and/or historical information known about the entity performing the internet browsing activity. The service can be a landscaping service, a financial record preparation service, a house cleaning service, or any other service that the can be purchased by an entity that is searching the internet for such services. In the example implementation where the target entity is a patient entity, the action data can be a preferred treatment and the output data can be a positive result of the preferred treatment. For example, the treatment can be a prescription medication(s), a surgical procedure(s), an exercise program, a change in diet, and so on. Patients being administered a particular treatment might shown different levels of recovery and the benefit/detriment to the patients can vary. Accordingly, the output data can include one or more actions that can provide a greater chance of recovery for the patient.

The non-limiting system 200 (as well as other embodiments disclosed herein) can view data related to a target entity that can be in the form of triplets (e.g., features, actions, and outcomes (e.g., feedback in response to the actions). The non-limiting system 200 can take the data triples (e.g., three types of items) and transform the data triples from the three items into a paired output (e.g., two items) that can have a higher conversion probability (or success rate). Accordingly, the non-limiting system 200 considers the data from the three inputs, without ignoring (or discarding) one of the inputs (e.g., uses all the inputs), in order to create the output data. For example, the features, actions, and outcomes can be mapped to features and actions (e.g., doubles or pairs of data) that are tailored for the target entity. According to some implementations, the output data (e.g., the features and actions) can be input to another system in order for multi-class classification to be performed on the output data.

Examples of input actions can be a customer (e.g., a target entity) engaging in online shopping within a website. Various information related to the customer can be retained in a customer file. For example, the information can include, but is not limited to, age, previous activity with that website (or with another website), purchase history, and so on. The information can be features associated with the customer that describe the customer. Based on what the customer is viewing, and in view of the information related to the customer, the website might recommend products to the customer (e.g., in the form of action data). In an example of a movie website, the customer could be provided with a list of movies that might be of interest to the customer. Thus, the action is from the system and relates to historical recommendations. In another example, if the customer is browsing flat screen televisions, recommendations for one or more other flat screen televisions could be provided. The outcome, in this example, would be the customer actually clicking on (e.g., selecting and buying) the recommended flat screen television. If the customer does not click (e.g., select) the recommendation, the recommendation is determined to not be suitable for that customer.

The various aspects map the input data into output data. For example, the input data can be data triples that can include features, actions, and outcomes; the pairs of data can include features and actions. The output data can be pairs of data (e.g., the newly created data set) that can be utilized as input to a standard classification method. In such a manner, a tailored relationship between the features and the actions can be defined in terms of the outcome desired (e.g., selections, purchases, relevant information, and so on). The various aspects can learn, based on the features, what is the action to take based on the mapping and can additionally utilize a classification method to determine the best action to take.

According to some implementations, a data set can be created wherein actions that have been more successful based on the outcome can be weighed more heavily than other actions. Thus, the output 112 can be provided that comprises features and action pairs with additional weights or other information included or associated with one or more pairs comprising features and actions. The mapping can operate in such a manner that the actions that lead to more positive outcomes (e.g., positive feedback from the user), can be weighed more heavily than actions which were not selected (e.g., negative feedback from the user). According to some implementations, instead of using weighting to describe the output data, the data can be replicated a defined number of times to create the higher weight. The utilization of weighting or replication can be dependent on the algorithm utilized to further analyze the output pairs. Additional information related to the weighting and/or replication will be provided below with respect to FIGS. 3, 4, and 5 below.

Figure 3:
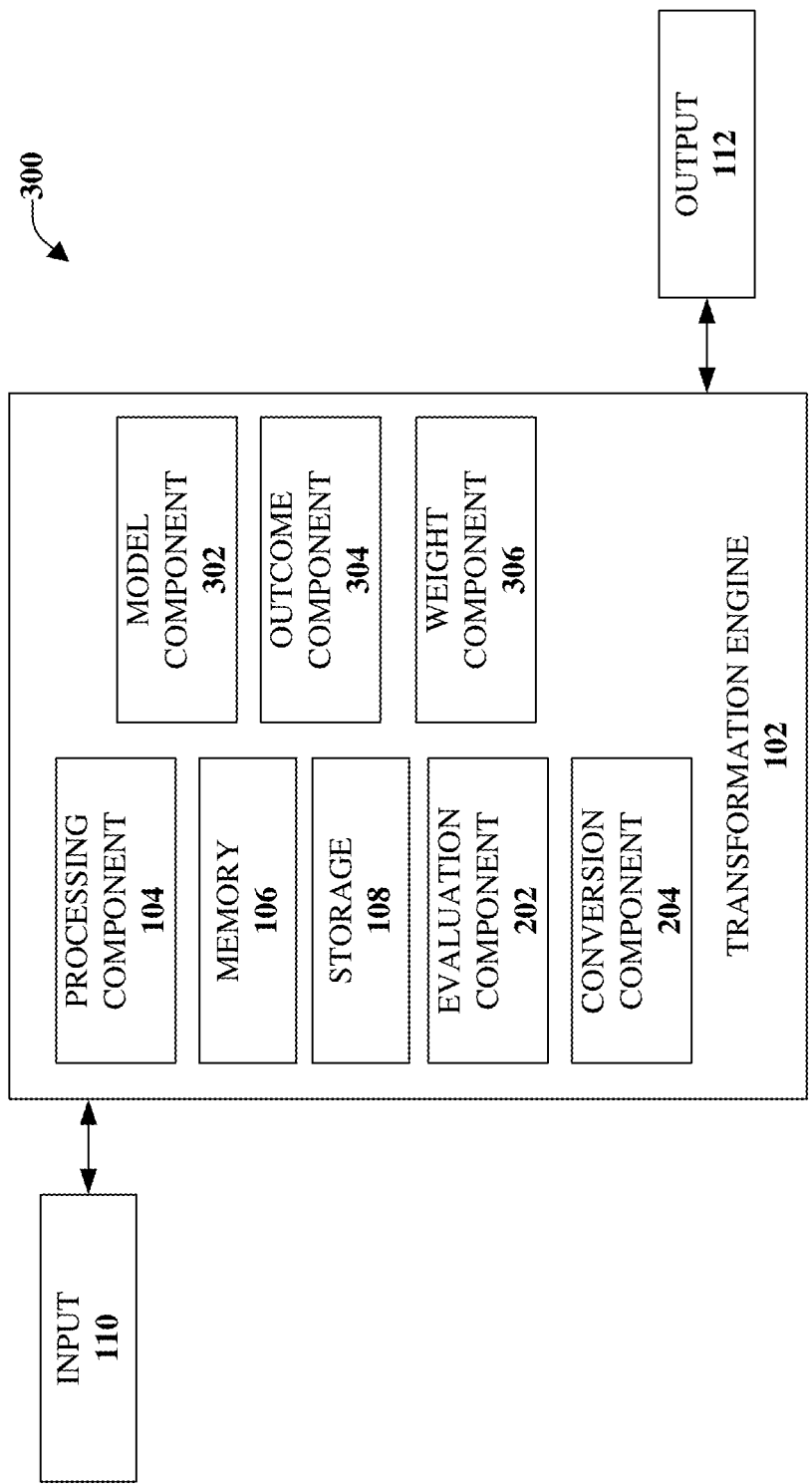
FIG. 3 illustrates a block diagram of an example, non-limiting system that facilitates an interpretable recommendation for customized outputs in accordance with one or more embodiments described herein.

FIG. 3 illustrates a block diagram of an example, non-limiting system 300 that facilitates an interpretable recommendation for customized outputs in accordance with one or more embodiments described herein. Repetitive description of like elements employed in other embodiments described herein is omitted for sake of brevity.

The non-limiting system 300 can comprise one or more of the components and/or functionality of non-limiting system 100 and/or non-limiting system 200, and vice versa. The non-limiting system 300 can include a model component 302, an outcome component 304, and a weight component 306. The model component 302 can generate one or more models that predict a first positive outcome based on a first feature and a first action. The first feature can be selected from one or more historical features related to a target entity and the first action can be selected from one or more historical actions provided to the target entity.

The outcome component 304 can determine a level of probability that one or more outcomes of one or more actions will be positive is higher than a defined level of probability. The one or more actions can be future actions or future recommendations (and the one or more positive outcomes can be predicted outcomes or combinations of the one or more historical actions (excluding the first action) and the one or more historical features (excluding the first feature). The weight component 306 can determine a loss-preserving weight of the combinations. For example, the weight component 306 can determine whether a cost of providing the future recommendations is about the same as (or less than) a cost of providing the historical recommendations.

The following will describe an example related to an online recommender system for personalized content and promotions. This example is not meant to be limiting but is provided for purposes of explaining the one or more aspects provided herein. For an incoming customer, the non-limiting system 300 can recommend a content or a promotion (an action) from a set of available options $\mathcal{A}$. Respective customers of the one or more customers can be represented by a feature vector $x \in \mathcal{X}$. When action $a \in \mathcal{A}$ is taken (e.g., when option a is provided, to a customer with feature x), the customer converts to purchase with probability p(x,a). The optimal option for a customer with feature x is the maximizer of the conversion probability, which is denote by $a^*(x) = \arg\max_{a \in \mathcal{A}} p(x,a)$. The optimal recommender (classifier) $h(\cdot): \mathcal{X} \to \mathcal{A}$ maximizes the expected conversion rate $E_a[p(x,h(x))]$, where the expectation is taken over the distribution of customer feature x. The objective can be to obtain a near optimal classifier that comprises a small number of interpretable rules.

Given $S = \{(x_1,a_1,o_1)), \ldots, (x_N,a_N,o_N)\}$, which comprises historical customer feature $x_n$, taken action $a_n$, and the realized outcome $o_n \in \{0,1\}$. Given this data set, an estimator f(x,a) can be built for the conversion probability p(x,a). Without the interpretability constraint, the recommender system can simply recommend an action a with the highest estimated conversion rate for the given customer feature, (e.g., classify x to $\arg\max_a$ f(x,a)). To obtain interpretable recommendation rules using existing multi-class classification algorithms, the data set S can be transformed to a new set $\mathcal{T}$ whose elements are pairs of the customer feature x and an action a.

For the loss-preserving transformation, an approach to construct $\mathcal{T}$ is to discard a record $(x_n,a_n,o_n) \in S$ if $o_n = 0$, and otherwise add $(x_n,a_n)$ to $\mathcal{T}$. This approach can be problematic, for example, if the prior actions are not uniformly distributed. If a certain promotion option was heavily used before, then a recommender trained with $\mathcal{T}$ can classify most inputs to this option.

Another approach to construct $\mathcal{T}$ can be to construct an estimator f(x,a) for the conversion probability, and for the one or more $(x_n,a_n,o_n) \in S$ putting $(x_n, \arg\max_{a \in \mathcal{A}} f(x_n,a))$ to $\mathcal{T}$. In this case, the two sets have approximately the same size, but the action taken in the past is replaced with an estimated optimal action. For the one or more $(x,a) \in \mathcal{T}$, classifying feature x to an action other than action a incurs some misclassification penalty, and thus it is encouraged to classify feature x and an action a. This transformation method can be used as a benchmark method.

Although every element in $\mathcal{T}$ constructed by the benchmark method can contain the estimated optimal action for the given input and thus encourages optimal classification, the approach does not reflect the impact of misclassification cost properly. To illustrate this point, consider a classifier $h(\cdot): \mathcal{X} \to \mathcal{A}$. For a customer with feature x, the cost of the classifier h(x) is p(x,a*(x))−p(x,h(x)), which is the difference between the optimal conversion rate and the conversion rate under the recommended action h(x). Thus, the total loss of the classifier $h(\cdot)$ on the data set S is $$\mathcal{L}_S(h) = \sum_{n=1}^{N} [p(x_n, a^*(x_n)) - p(x_n, h(x_n))]$$

Now suppose that for some $x_n, p(x_n,a)$ is about the same for every a (e.g., $p(x_n,a) = p(x_n,a^*(x))$ for every $a \in \mathcal{A}$). In this case, there is no cost in recommending any action for $x_n$. Therefore, for the purpose of obtaining recommendation rules, $(x_n, a^*(x_n))$ might be useless (e.g., it should be effectively removed from $\mathcal{T}$). Next, suppose that for some $x_n, p(x_n,a^*(x_n)) = 1$ and $p(x_n,a) = 0$ for every $a \neq a^*(x_n)$. In this case, classifying $x_n$ to a suboptimal action is always 1, which is the maximum loss in the conversion rate. Thus, it might be determined to ensure that $x_n$ is classified to $a^*(x_n)$ in the recommendation rules. These examples can imply that misclassification penalties depends on the feature and the classes.

To incorporate the feature and class dependent misclassification penalty, the sample weights (or similarly the number of replicas) in $\mathcal{T}$ can be controlled. Consider the following construction procedure for $\mathcal{T}$: for one or more $n \in \{1, \ldots, N\}$ and $a \in \mathcal{A}$, let $k_n^a$ be the weight of sample $(x_n,a)$ in $\mathcal{T}$. Thus, on $\mathcal{T}$ classifying $x_n$ to an action a incurs the total 0/1 misclassification penalty of $\sum_{a \in \mathcal{A} \setminus \{a\}} k_n^a$. The total 0/1 misclassification penalty of a classifier $n(\cdot)$ on $\mathcal{T}$ is given as $$\mathcal{L}_\mathcal{T}(h) = \sum_{n=1}^{N} \sum_{a \in A: a \neq h(x_n)} k_n^a$$

As it can be readily shown, this condition is satisfied when for every n and a, $$\sum_{\tilde{a} \in A \setminus \{a\}} k_n^{\tilde{a}} = K[p(x_n, a^*(x_n)) - p(x_n, a)] + L, \quad \text{Equation 1.}$$

holds for some K and L. Sample weights need to be non-negative and $k_n^a \geq 0$. The next proposition, which follows by simple algebraic manipulation, bounds the loss due to (approximately) solving the transformed problem.

A proposition (Proposition 1) can be to let K>0 and let ~h be an approximate minimizer of $\mathcal{L}_\mathcal{T}$. Then:

$$\mathcal{L}_\mathcal{T}(\tilde{h}) \leq \frac{\mathcal{L}_\mathcal{T}(\tilde{h})}{\mathcal{L}_\mathcal{T}(h^*)} \mathcal{L}_S(h^*) + \frac{\mathcal{L}_\mathcal{T}(\tilde{h})}{\mathcal{L}_\mathcal{T}(h^*)} \frac{L}{K}.$$

And in particular, $\arg\max_h \mathcal{L}_\mathcal{T}(h) = \arg\max_h \mathcal{L}_S(h)$, by setting $\tilde{h} = h^*$. In other words, solving $\mathcal{L}_\mathcal{T}$ can provide a solution for $\mathcal{L}_S$ and if the solution is approximate, the quality of the approximation is better for smaller values L. The loss function $\mathcal{L}_\mathcal{T}$ can be minimized and/or reduced using standard multi-class classification methods and any optimal classifier is also optimal in terms of $\mathcal{L}_S$.

Another proposition (Proposition 2) can be a solution to Equation 1, which is given by:

$$k_n^a = \frac{1}{|A|-1}\left(K\left(\sum_{\tilde{a} \in A} q_n^{\tilde{a}}\right)\right) - K(|A|-1)q_n^a + L, \quad \text{Equation 2.}$$

where $q_n^a = p(x_n, a^*(x_n)) - p(x_n, a)$.

The proof for Equation 2 will now be discussed, for example, by an immediate application of a Sherman-Morrison-Woodbury formula. In addition, since $\min_{a \in \mathcal{A}} q_n^a = 0$ in Proposition 2, it can be shown that L≥0.

When sing sample replication instead of weights, $k_n^a$ might not be an integer. One solution for this issue is to estimate $k_n^a$ to the nearest integer. Another approach can be to insert $\lfloor k_n^a \rfloor$ replicas of$(x_n, a)$ to $\mathcal{T}$, and add one more replica randomly with probability $k_n^a - \lfloor k_n^a \rfloor$. Both approaches can incur a bias between the two loss functions. However, the impact can be minor if $k_n^a$ are much larger than 1. For this reason, a large K may be utilized, however, the size of $\mathcal{T}$ increases as K increases.

In practice, the true conversion probability p (x,a) might not be given, and thus should be estimated using the historical data. Thus, interpretable rule generation for personalized recommendation can be performed in multiple steps. First, build an estimator for the conversion probability using S. Next, with the estimated conversion probability transform S to $\mathcal{T}$ based on equation 2. Lastly, build a classifier using $\mathcal{T}$.

Figure 4:
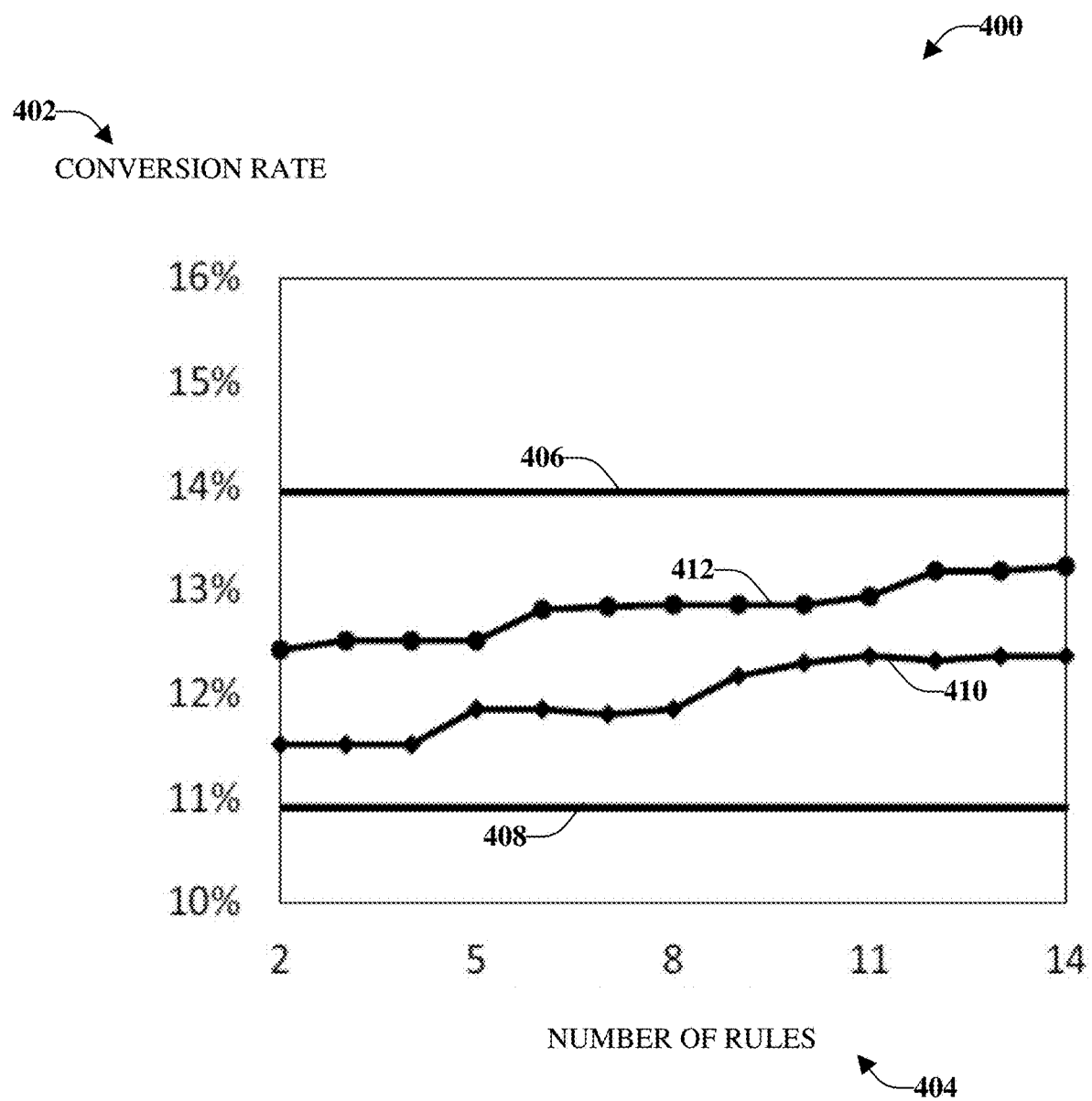
FIG. 4 illustrates an example, non-limiting graph for results of average conversion rates compared to a number of rules according to numerical experiments performed in accordance with one or more embodiments described herein.

FIG. 4 illustrates an example, non-limiting graph 400 for results of average conversion rates 402 compared to a number of rules 404 according to numerical experiments performed in accordance with one or more embodiments described herein. The numerical experiments were performed to demonstrate the value of the transformation aspects discussed herein. A data set including three million records of price searches on the website of a transportation company including customer features and estimated conversion probabilities under eight different promotion options was utilized. Among the three million records, two million records were utilized to train two classifiers using a Classification and Regression Tree (CART) algorithm. The first classifier was trained on a set that is constructed via the benchmark method (e.g., a set comprises $(x_n, a^*(x_n))$). The second classifier was trained on a set that was constructed by the transformation aspects discussed herein. The CART algorithm can incorporate sample weights, thus, $k_n^a$ defined in Equation 2 was used as the sample weight for $(x_n, a)$ instead of adding $k_n^a$ replicas of$(x_n, a)$. By increasing the number of rules to generate (number of leaf nodes in a classification tree), the conversion rate was computed under the two classifiers using the remaining one million records under the assumption that the estimated conversion probabilities are true conversion probabilities. Since actions recommended by the classifiers might not be the same as (or similar to) the actual promotion provided in the historical data set, the quality of the classifiers cannot be tested in a truly fair manner.

Illustrated in FIG. 4 is an upper bound 406, a lower bound 408, results of the benchmark method 410, and results of the transformation method 412. The upper bound 406 represents the conversion rate when the optimal promotion $a^*(x_n)$ is always recommended for one or more customers $x_n$. The lower bound 408 is the conversion rate when the worst promotion is always recommended to the one or more customers (promotion with the lowest conversion probability). FIG. 4 illustrates that for one or more given number of rules, the recommendation rules obtained via the transformation aspects discussed herein have a significantly higher conversion rate than the rules obtained via the benchmark method. As discussed above, the training data set constructed by the benchmark method contains the exact information on the optimal action for respective ones of the one or more records. Thus, the deviation from the upper bound 406 can be primarily incurred by the limitation on obtaining a smaller number of interpretable rules. Even under the disclosed transformation aspects, this limitation substantially deteriorates the quality of the recommender. Yet, the deviation from the upper bound is much smaller when the conversion method disclosed herein is utilized. This result highlights the importance of rigorously addressing the sample and class dependent misclassification loss when obtaining a small number of interpretable classification rules.

Figure 5:
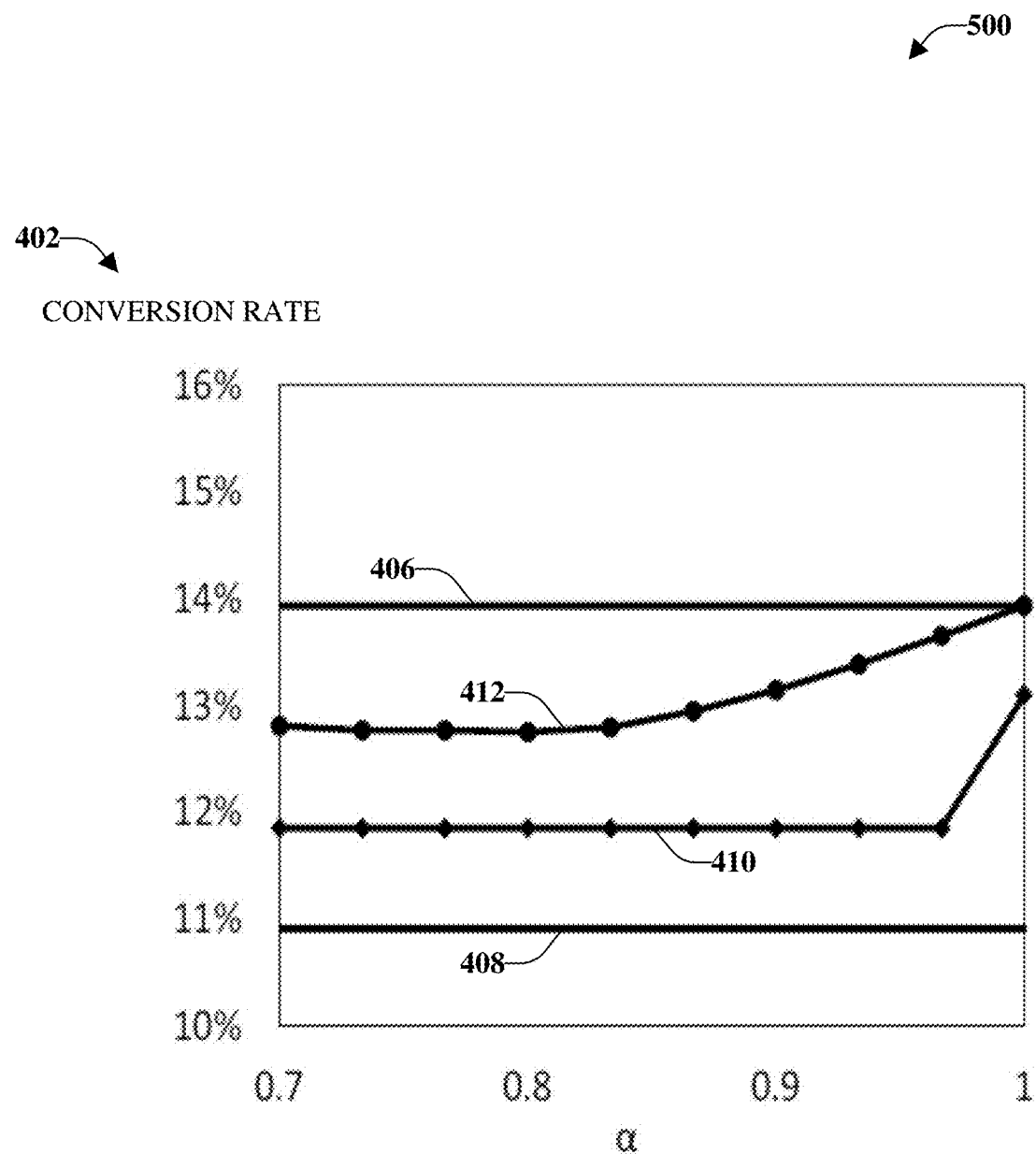
FIG. 5 illustrates an example, non-limiting graph for results of average conversion rates according to another numerical experiment performed in accordance with one or more embodiments described herein.

FIG. 5 illustrates an example, non-limiting graph 500 for results of average conversion rates according to another numerical experiment performed in accordance with one or more embodiments described herein. Repetitive description of like elements employed in other embodiments described herein is omitted for sake of brevity. The experiment of FIG. 5 was performed to illustrate the value of the disclosed loss-preserving transformation aspects. In this experiment, one additional fictitious promotion was added to the original problem. The conversion probability of this promotion is defined as max $\{\min_{a \in \mathcal{A}} p(x_n, a), \alpha \max_{a \in \mathcal{A}} p(x_n, a)\}$ for some $\alpha \in [0,1]$. Therefore, this promotion performs at least as well as the worst promotion, and performs close to the optimal when α is close to one. Thus, a good classifier would safely recommend this promotion to most customers when α is close to 1.

For this experiment, the number of rules was fixed at six, and the same experiment as used for FIG. 4 was repeated while changing the value of α. Note that the fictitious promotion does not change the worst and best conversion probability, and thus the lower and upper bounds do not change. The training set constructed via the benchmark method is not affected by the additional promotion except for when a α=1. When α<1, the additional promotion is never optimal, and thus the training data would not have any record containing this additional promotion. Consequently, no rule that recommends this promotion can be obtained. An interesting observation is the fact that the conversion rate under the benchmark method is still notably smaller than the upper bound when α=1. When α=1, always recommending this promotion can achieve the upper bound (e.g., it is globally optimal). However, since there can always be another promotion that achieves the same best conversion, the benchmark method can produce a training data set that contains other promotions, which are only locally optimal. Thus, with the interpretability constraint, the classifier trained out of this data set can fail to produce an optimal set of rules.

When the transformation aspects discussed here are utilized, the conversion rate of the recommender increases as α increases in a smooth way, and achieves the upper bound when α=1. The result illustrates another reason why rigorously incorporating the sample and class dependent misclassification error is important in interpretable rule generation. Thus, the various aspects discussed herein can improve the robustness of classification rules, which often are known to change drastically by a small number of additional data points.

Accordingly, the various aspects discussed herein can utilize conversion probabilities under all actions for each given customer feature, which needs to be estimated from data. The prediction error of the conversion probability estimator can influence construction of the transformed data, which in turn affects the trained classifier. Analysis of the impact of the prediction error in the original space on the quality of the classifier on the transformed space can help improve the transformation method to minimize and/or reduce the true loss of recommendation rules.

Figure 6:
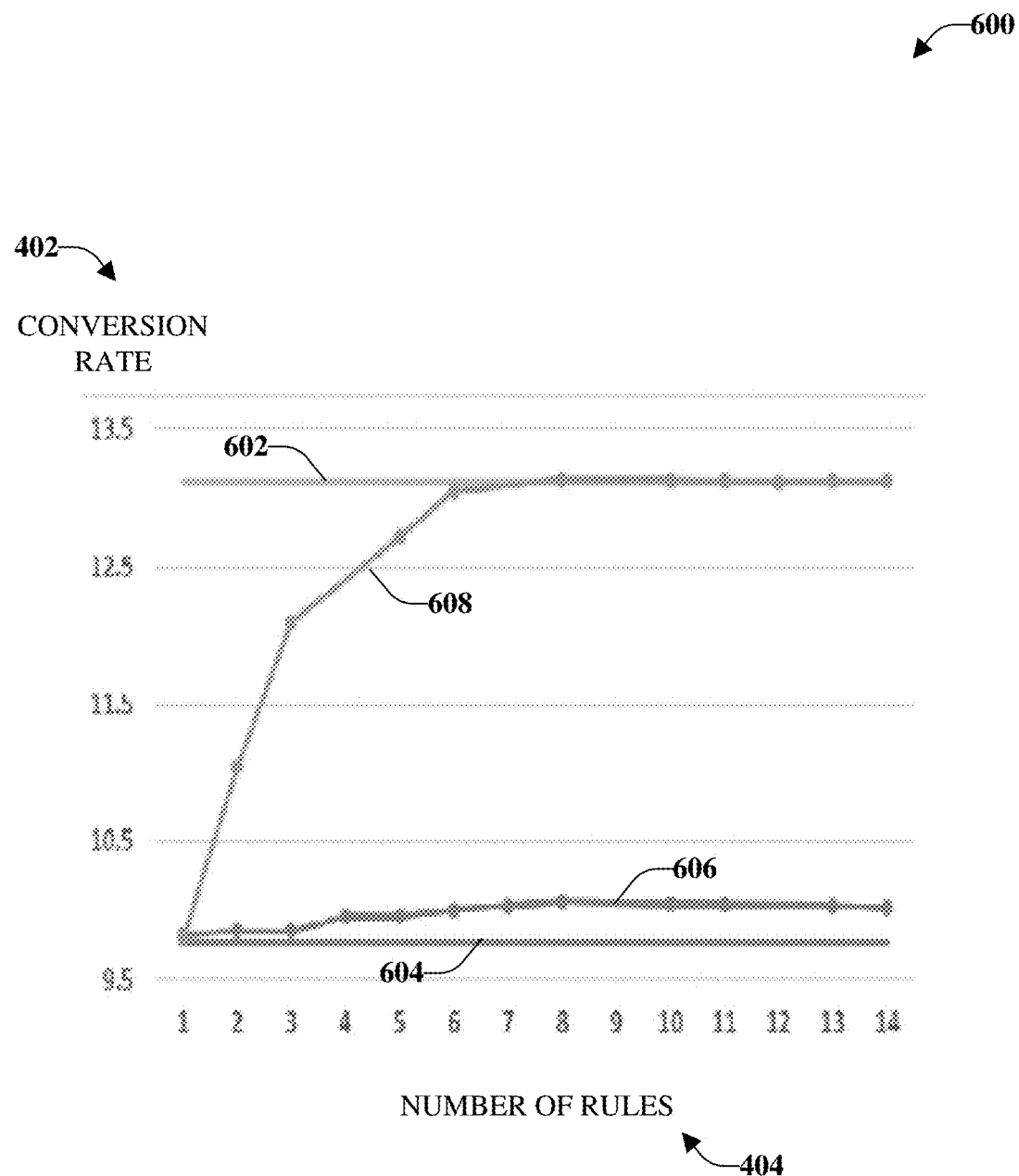
FIG. 6 illustrates an example, non-limiting graph for results of average conversion rates according to yet another numerical experiment performed in accordance with one or more embodiments described herein.

FIG. 6 illustrates an example, non-limiting graph 600 for results of average conversion rates according to another numerical experiment performed in accordance with one or more embodiments described herein. Repetitive description of like elements employed in other embodiments described herein is omitted for sake of brevity.

According to an implementation related to an online marketing program, historical promotion (content) recommendation data are given in the format of:

$$S=\{(x_1,a_1,o_1), \ldots (x_N,a_N,o_N)\}$$

where customer feature $x \in \mathcal{X}$; recommended promotion $a \in \mathcal{A}$, and outcome $o_n \in \{0,1\}$.

Such data can be utilized to build a black-box type recommender. For example, build prediction models for $p(x,a)=\text{Prob}(o=1|x,a)$. Recommend $a^*(x)=\text{argmax}_a\ p(x,a)$. To use classification algorithms to generate a small number of interpretable recommendation rules, data of the following form can be utilized: $\mathcal{T} \subseteq \mathcal{X} \times \mathcal{A}$. Further, S can be converted into $\mathcal{T}$ while preserving the loss function in the original space.

As it relates to misclassification loss, let $h(\cdot)$ be a classifier that maps one or more customer feature to an action. The total loss in the conversion rate can be $L_S(h)=\Sigma_{n=1}^N[p(x_n, a^*(x_n))-p(x_n,h(x_n))]$. A new set $\mathcal{T} \subseteq \mathcal{X} \times \mathcal{A}$ can be constructed by adding $k_n^a$ replicas of $(x_n,a)$ for the one or more n's and the one or more a's. Then, the total zero-one misclassification error of the classifier $h(\cdot)$ on $\mathcal{T}$ can be:

$$\mathcal{L}_{\mathcal{T}}(h)=\Sigma_{n=1}^N \Sigma_{a \neq h(x_n)} k_n^a$$

Therefore, for the one or more n's and the one or more a's, $$\sum_{\hat{a} \neq a} k_n^{\hat{a}} = K[p(x_n, a^*(x_n)) - p(x_n, a)] + L,$$

holds, then $\mathcal{L}_S(h)=K\mathcal{L}_{\mathcal{T}}(h)+L$ also holds (K should be a positive number).

To determine the number of replicas, the following can be utilized. The solution of the system of equations (1) can be given as:

$$k_n^a = \frac{K}{|A|-1}\left(\left[\sum_{\hat{a} \in A} q_n^{\hat{a}}\right] - (|A|-1)q_n^a + |A|L\right)$$

where $q_n^a = p(x_n, a^*(x_n)) - p(x_n, a)$.

L can be determined such that $k_n^a=0$ at the minimum value. The size of $\mathcal{T}$ increases as K increases. In almost all n and a, $k_n^a$ is not an integer. Estimate to the nearest integer. Randomize: $\lfloor k_n^a \rfloor$ replicas and one additional replica with probability $k_n^a - \lfloor k_n^a \rfloor$. Both methods can incur some bias, but the impact can disappear when K is large (e.g., around 30). Certain multi-class classification algorithms (such as CART) take sample weights as input. In that case, only one replica of $(x_n,a)$ can be added and $k_n^a$ can be used as the sample weight.

The numerical result is illustrated in FIG. 6. Illustrated are a black box bound 602, a random bound 604, a first result 606 without using loss-preserving transformation, and a second result 608 with the use of loss-preserving transformation. As illustrated, conversion under the rules obtained via loss-preserving transformation (second result 608) converges to the conversion rate of the black-box algorithm (black box bound 602) Without loss-preserving transformation, $\mathcal{T}$ can be constructed by adding $(x_n, a^*(x_n))$ for the one or more ns. Without loss-preserving transformation (first result 606), conversion rate can be improved over a pure random policy by about 0.4 percentage points, according to an example implementation.

Figure 7:
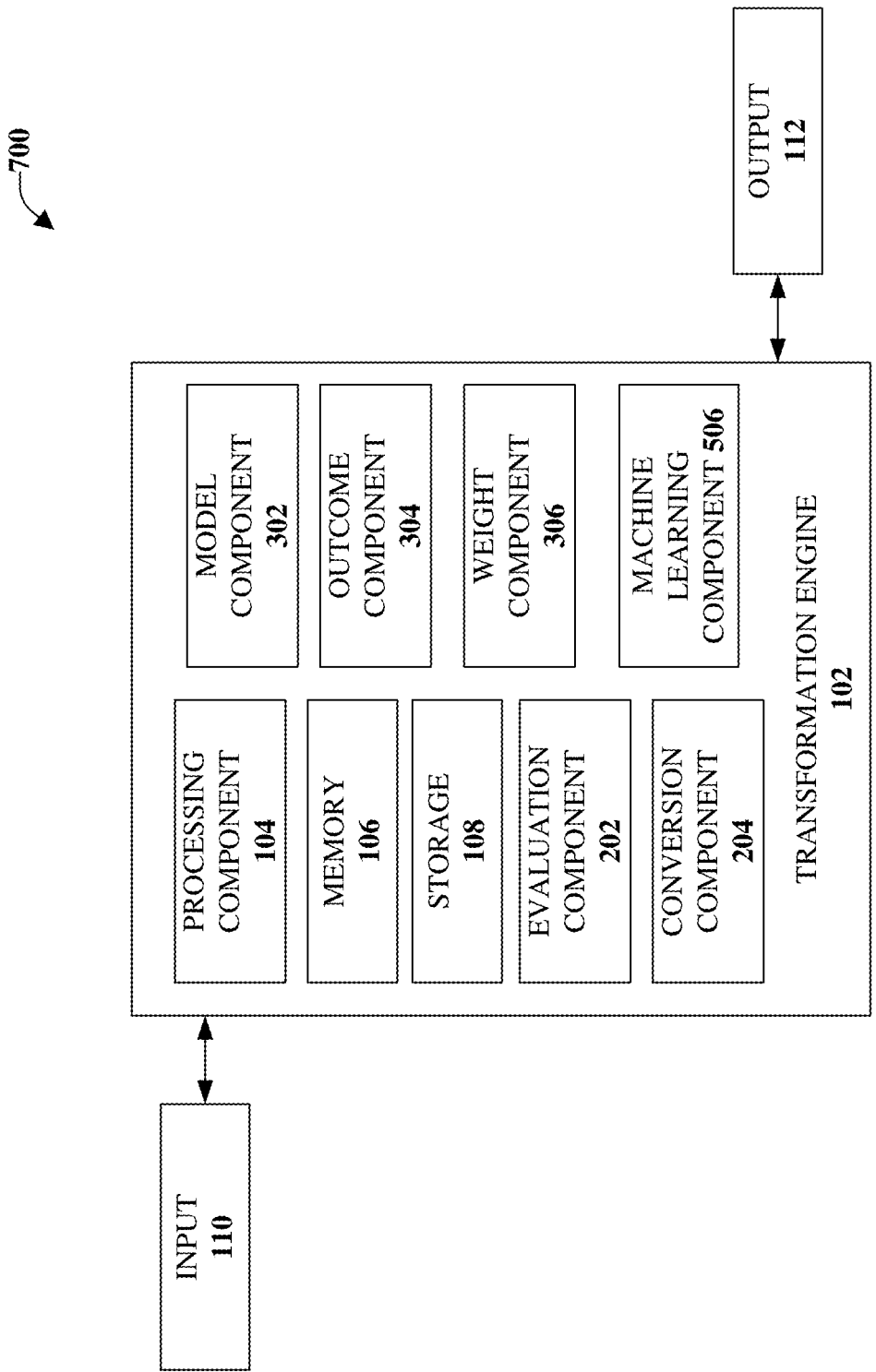
FIG. 7 illustrates a block diagram of an example, non-limiting system that facilitates interpretable rule generation using loss-preserving transformation in accordance with one or more embodiments described herein.

FIG. 7 illustrates a block diagram of an example, non-limiting system 700 that facilitates interpretable rule generation using loss-preserving transformation in accordance with one or more embodiments described herein. Repetitive description of like elements employed in other embodiments described herein is omitted for sake of brevity.

The non-limiting system 700 can comprise one or more of the components and/or functionality of the non-limiting system 100, the non-limiting system 200, and/or the non-limiting system 300, and vice versa. The non-limiting system 700 can include a machine learning component 702. The machine learning component 702 can perform a set of machine learning computations associated with the input 110 and/or the output 112. For example, the machine learning component 702 can determine respective combinations of data inputs (e.g., data triples) and transform the data inputs into a transformed data set based on a minimization of a loss function associated with the respective combinations of three data inputs. The transformed data set can comprise respective output pairs.

The machine learning component 702 can utilize machine learning systems that have been explicitly or implicitly trained to learn, determine or infer system (or entity) recommendations, historical data, feedback based on historical recommendations, and so on, that achieve positive outcomes, and so on. It is to be appreciated that machine learning systems can be implemented in one or more of the components to generate explicitly and/or implicitly trained models that provide the desired transformed data set.

The various aspects discussed herein can relate to building an interpretable recommender system for personalizing online content and promotions, for example. Historical data available for the system (e.g., input data) can include customer features, provided content (promotions), and user responses. In another example related to healthcare, the input data can include medical history, recommended treatments, and outcomes of the treatment (e.g., did the patient's health improve).

Unlike in a standard multi-class classification setting, misclassification costs depend on both recommended actions and customers (e.g., specific details related to the customers). The various aspects can transform such a data set to a new set, which can be used with standard interpretable multi-class classification algorithms. The transformation can include a property that minimizes and/or reduces the standard misclassification penalty in this new space, which can be equivalent to minimizing and/or reducing the custom cost function.

As provided herein, the various aspects can provide embodiments that can recommend personalized content and promotions in an understandable manner. The various aspects can transform historical marketing and/or program data (and other types of applications) with sample dependent costs into a new data set with an identical (or nearly identical) standard (or 0/1) misclassification error. With the transformed data, existing multi-class classification algorithms can be utilized to obtain interpretable (e.g., explainable) recommendation rules.

Figure 8:
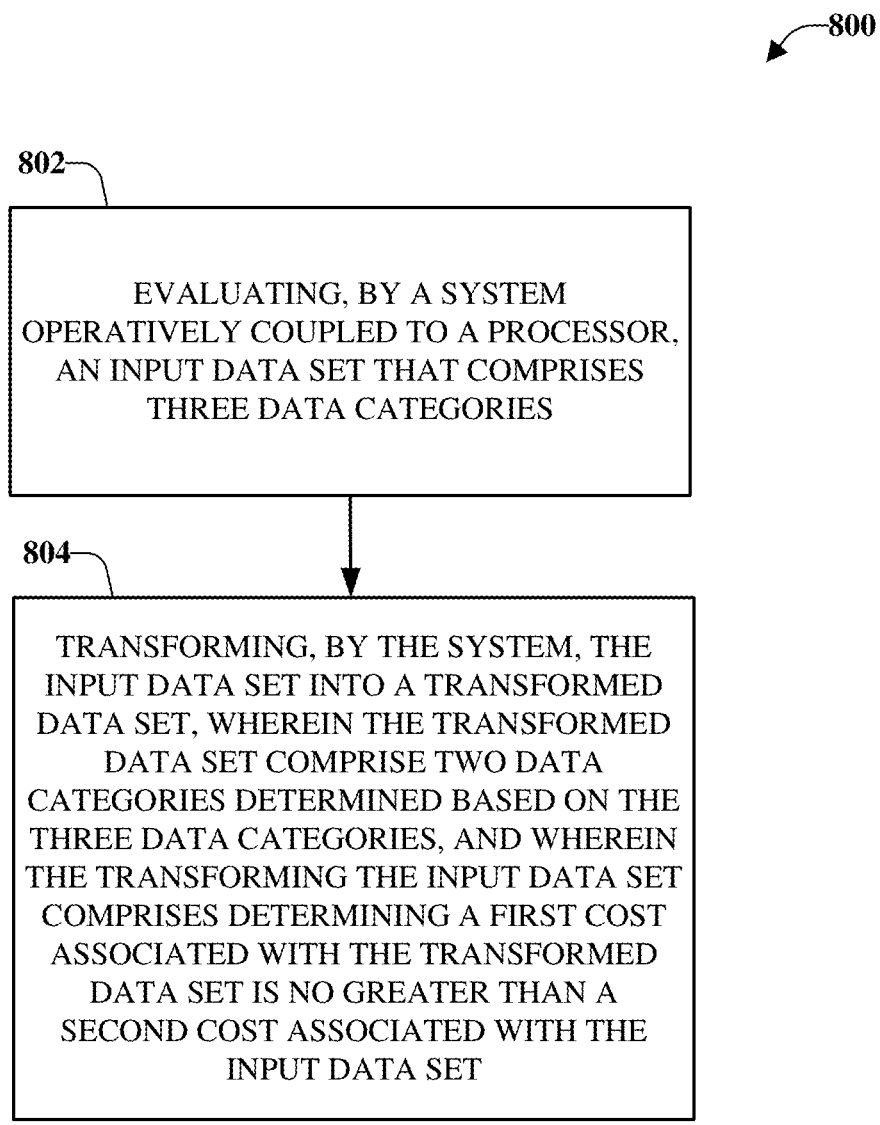
FIG. 8 illustrates a flow diagram of an example, non-limiting computer-implemented method that facilitates interpretable rule generation in accordance with one or more embodiments described herein.

FIG. 8 illustrates a flow diagram of an example, non-limiting computer-implemented method 800 that facilitates interpretable rule generation in accordance with one or more embodiments described herein.

At 802, a system operatively coupled to one or more processors, can evaluate an input data set that comprises three data categories (e.g., via the evaluation component 202). According to some implementations, the input data set can comprise a first data category, a second data category, and a third data category. The first data category can comprise feature data associated with a target entity, the second data category can comprise action data provided to the target entity, and the third data category can comprise feedback data received from the target entity. In an example, the target entity can be a consumer entity, the action data can be a recommended product, and the feedback data can be a purchase of the recommended product. According to another example, the target entity can be a patient entity, the action data can be a preferred treatment, and the feedback data can be a positive result of the preferred treatment.

At 804, the system can transform the input data set into a transformed data set (e.g., via the conversion component 204). The transformed data set can comprise two data categories determined based on the three data categories of the input data set. Further, transforming the input data set can comprise determining a first cost associated with the transformed data set is no greater than a second cost associated with the input data set. According to some implementations, transforming the input data set into a transformed data set comprises transforming input data that comprises scalable data without a corresponding decrease in a processing efficiency of the system.

For example, the first cost associated with the transformed data set can be selected to be equal or less than the second cost associated with the input data set. According to an implementation, transforming the input data set can comprise minimizing and/or reducing a loss function associated with the two data categories. The loss function can be selected to be equal or less than another loss function associated with the input data set. The non-limiting computer-implemented method 800 can also include inputting, by the system, the transformed data set into a multi-class classification system for further customization related to recommended actions. According to some implementations, transforming the input data set can include selecting the transformed data set to increase a probability of feedback related to the action data being positive feedback.

In accordance with an implementation, the input data set cam be a first input data set and evaluating the first input data set can include generating a model that predicts a first positive outcome based on the first input data set. Further to this implementation, the method can include determining a second positive outcome based on the first positive outcome and a second input data set. According to an implementation, the first positive outcome can be a first positive feedback to a first recommended action and the second positive outcome can be a second positive feedback to a second recommended action.

In an alternative or additional implementation, the method can include generating an interpretable recommendation rule based on the transformed data set being applied to a multi-class classification system. The interpretable recommendation rule can be a rule that is capable of interpretation by an entity. Further, a generation of the interpretable recommendation rule can be based on a conversion rate of an associated recommended action included in the transformed data set.

Figure 9:
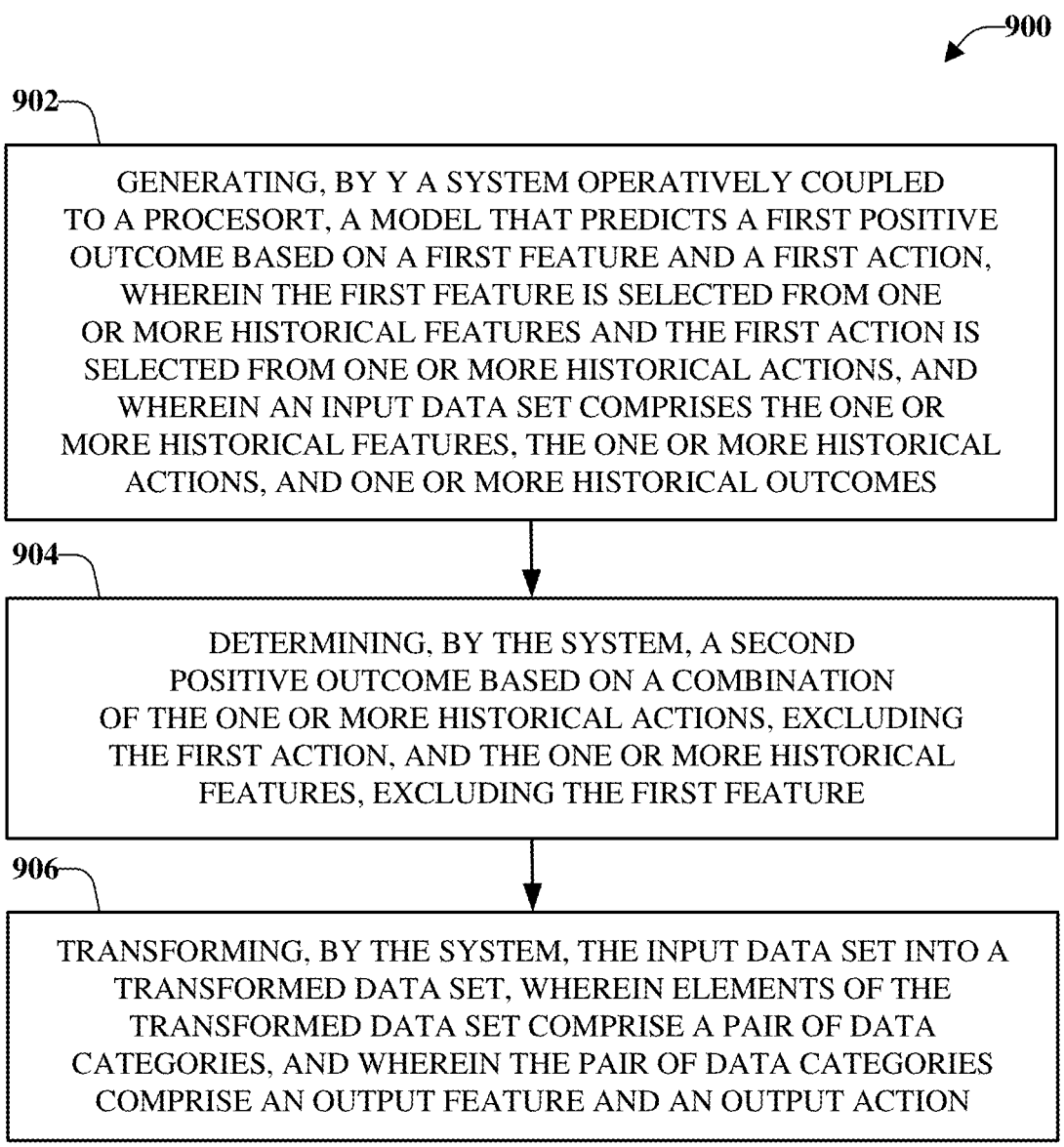
FIG. 9 illustrates a flow diagram of an example, non-limiting computer-implemented method that facilitates interpretable rule generation using operational support systems preserving transformation in accordance with one or more embodiments described herein.

FIG. 9 illustrates a flow diagram of an example, non-limiting computer-implemented method 900 that facilitates interpretable rule generation using operational support systems preserving transformation in accordance with one or more embodiments described herein.

At 902, a system operatively coupled to one or more processors, can generate, a model (simulation or representation) that can predict a first positive outcome based on a first feature and a first action (e.g., via the model component 302). The first feature can be selected from one or more historical features and the first action can be selected from one or more historical actions. The input data set can comprise the one or more historical features, the one or more historical actions, and the one or more historical outcomes.

According to an implementation, the input data set can comprise data triples of data categories comprising a first data category, a second data category, and a third data category. The first data category can comprise feature data associated with a target entity, the second data category can comprise action data, and the third data category can comprise output data.

At 904, a second positive outcome can be determined based on a combination of the one or more historical actions, excluding the first action, and the one or more historical features, excluding the first feature (e.g., via the outcome component 304). For example, the second positive outcome can be a likelihood that a recommendation provided will be acceptable and a successful feedback will be received (e.g., the target entity will purchase an item). The input data set can be transformed into a transformed data set, at 906 (e.g., via the conversion component 204). The second positive outcome can be a second result of a second recommendation provided to the target entity.

According to an example, a recommender system can include data triples (e.g., customer features, actions, outcomes). In the context of personalized recommendation, such data triples can be suitable to estimate the conversion probability (e.g., the probability that the customer converts to purchase, under the one or more possible actions). Without the interpretability constraint, the recommender system can simply compare the estimated conversion probabilities for an incoming customer under the one or more possible actions and recommend the option with the highest conversion probability. In this case, even when the estimator of the conversion probability under one or more options is interpretable, the optimal recommendation policy might not be summarized in small number of interpretable rules. The various aspects provided herein can transform the original data with sample dependent costs into a new data set with an identical (or nearly identical) standard (or 0/1) misclassification error. With the transformed data, one or more multi-class classification algorithms can be utilized to obtain recommendation rules. Further, the actions captured in the training data can be independent of the effectiveness of the action depending on how previous actions were determined (e.g., it does not necessarily represent the correct class).

The transformation method can be more broadly applied to other settings in addition to an interpretable rule generation for recommender systems. There is almost always a cost associated with taking a particular action in some context. For instance, in healthcare, patients being administered a particular treatment can show different levels of recovery and consequently the benefit/detriment to them can vary. The various aspects provided herein can be utilized in these other settings.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
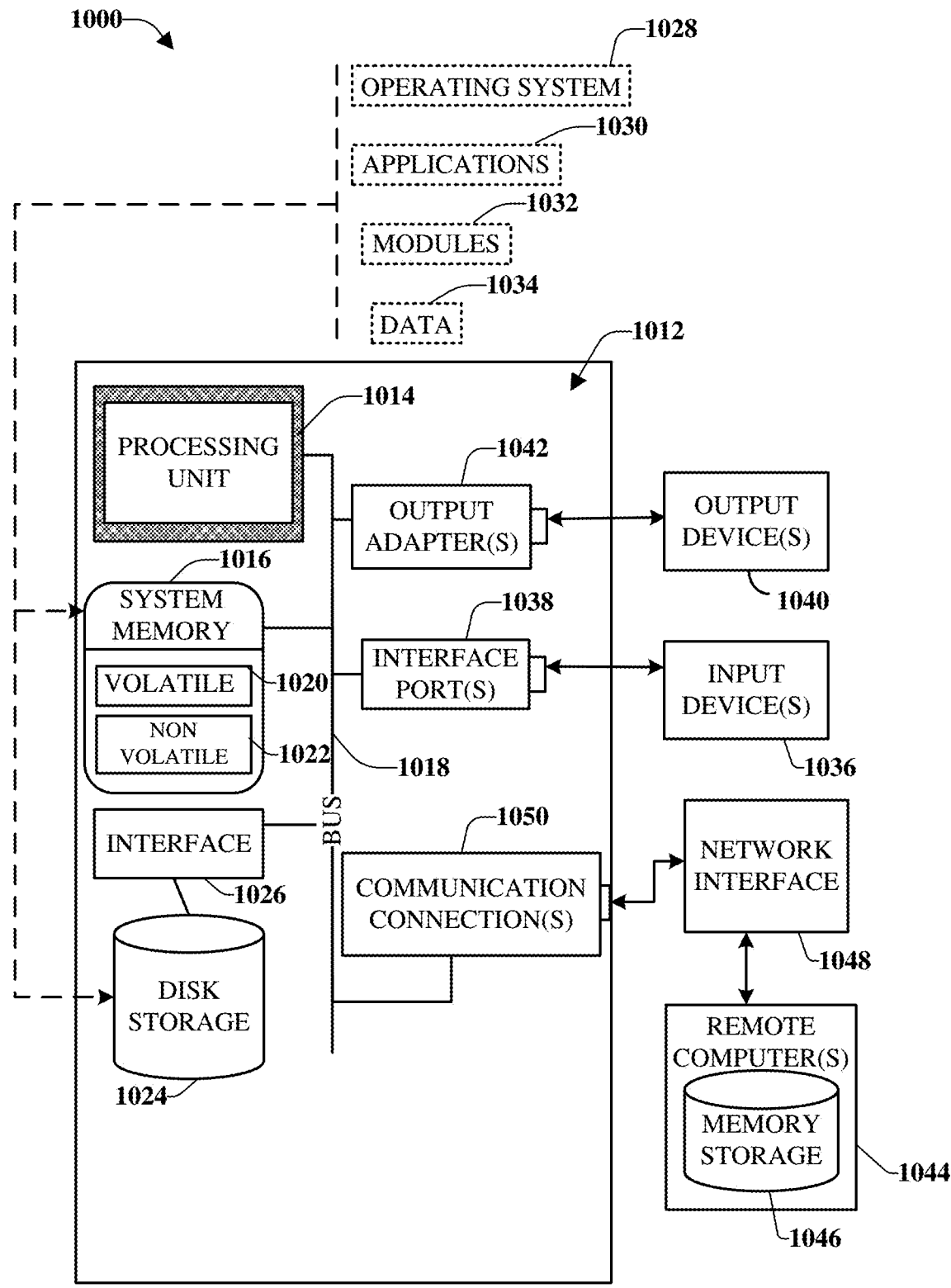
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
evaluating, by a system operatively coupled to a processor, using an evaluation component, an input data set associated with a user, wherein the input data set comprises three related data inputs, wherein the three related data inputs comprise a first set of data input comprising features describing known information about the user, a second set of data input comprising historical recommended actions provided to the user, and a third set of data input comprising outcomes describing how the user responded to the historical recommended actions; and
generating, by the system using a model component, a prediction model based on the three related data inputs and based on a reduction of a 0-1 loss function for a misclassification cost associated with the three related data inputs, wherein the prediction model transforms the three related data inputs into a transformed data set comprising output data pairs respectively comprising one or more features and one or more recommended actions that satisfy a defined condition related to a conversion probability of achieving one or more outcomes with respect to the one or more recommended actions, and wherein the 0-1 loss function is based on a first misclassification cost associated with the transformed data set being no greater than a second misclassification cost associated with the input data set, wherein the generating the prediction model comprises generating an estimator function that meets a conversion rate for recommended actions for features to outcomes that meets the conversion probability, and the estimator function applies respective weights to the output data pairs to meet the conversion probability; and
generating, by the system using an outcome component, at least one recommendation associated with the content based on the transformed data set.

2. The computer-implemented method of claim 1, wherein the content is health related content and the at least one recommendation action comprises a recommended action selected from a group consisting of treatment options and prescription options.

3. The computer-implemented method of claim 1, further comprising generating, by the system, recommendation rules for the prediction model based upon input data set.

4. The computer-implemented method of claim 1, wherein the generating the estimator function is based upon one or more rule learning algorithms that maximizes the conversion probability.

5. The computer-implemented method of claim 1, further comprising generating, by the system, a classifier for the estimator function to generate recommended actions based on the 0-1 loss function.

6. The computer-implemented method of claim 5, wherein the classifier minimizes the 0-1 loss function for the misclassification cost.

7. The computer-implemented method of claim 5, wherein the classifier is trained using the transformed data set by discarding output data pairs of features and recommended actions.

8. The computer-implemented method of claim 1, wherein the weights are indicative of an amount of a misclassification cost.

9. The computer-implemented method of claim 5, wherein the classifier is trained using the transformed data set by adding respective quantities of replicated output data pairs of features and recommended actions to the transformed data set.

10. The computer-implemented method of claim 5, wherein the classifier is trained using a benchmark method that defines an optimal recommended action for a subset of features to achieve a particular outcome.

11. A mobile device, comprising:
a memory that stores computer executable components; and
a processor that executes the computer executable components stored in the memory, to perform operations comprising:
evaluating, by an evaluation component, an input data set associated with a user, wherein the input data set comprises three related data inputs, wherein the three related data inputs comprise a first set of data input comprising features describing known information about the user, a second set of data input comprising historical recommended actions provided to the user, and a third set of data input comprising outcomes describing how the user responded to the historical recommended actions; and
generating, by a model component, a prediction model based on the three related data inputs and based on a reduction of a 0-1 loss function for a misclassification cost associated with the three related data inputs, wherein the prediction model transforms the three related data inputs into a transformed data set comprising output data pairs respectively comprising one or more features and one or more recommended actions that satisfy a defined condition related to a conversion probability of achieving one or more outcomes with respect to the one or more recommended actions, and wherein the 0-1 loss function is based on a first misclassification cost associated with the transformed data set being no greater than a second misclassification cost associated with the input data set, wherein the generating the prediction model comprises generating an estimator function that meets a conversion rate for recommended actions for features to outcomes that meets the conversion probability, and the estimator function applies respective weights to the output data pairs to meet the conversion probability; and generating, by an outcome component, at least one recommendation associated with the content based on the transformed data set.

12. The mobile device of claim 11, wherein the content is health related content and the at least one recommendation action comprises a recommended action selected from a group consisting of treatment options and prescription options.

13. The mobile device of claim 11, the operations further comprising generating recommendation rules for the prediction model based upon input data set.

14. The mobile device of claim 11, wherein the generating the estimator function is based upon one or more rule learning algorithms that maximizes the conversion probability.

15. The mobile device of claim 11, the operations further comprising generating, by the system, a classifier for the estimator function to generate recommended actions based on the 0-1 loss function.

16. The mobile device of claim 15, wherein the classifier minimizes the 0-1 loss function for the misclassification cost.

17. The mobile device of claim 15, wherein the classifier is trained using the transformed data set by discarding output data pairs of features and recommended actions.

18. The mobile device of claim 11, wherein the weights are indicative of an amount of a misclassification cost.

19. The mobile device of claim 15, wherein the classifier is trained using the transformed data set by adding respective quantities of replicated output data pairs of features and recommended actions to the transformed data set.

20. The mobile device of claim 15, wherein the classifier is trained using a benchmark method that defines an optimal recommended action for a subset of features to achieve a particular outcome.

* * * * *